US00RE35195E

United States Patent [19]

Nagano et al.

[11] E Patent Number: Re. 35,195

[45] Reissued Date of Patent: Apr. 2, 1996

[54] METHOD AND CONTROLLER FOR SUPPLYING FUEL TO CYLINDERS OF MULTICYLINDER INTERNAL COMBUSTION ENGINE

[75] Inventors: Masami Nagano; Takeshi Atago; Mamoru Nemoto, all of Katsuta, Japan

[73] Assignee: Hitachi, Ltd., Tokyo, Japan

[21] Appl. No.: 89,647

[22] Filed: Jul. 12, 1993

Related U.S. Patent Documents

Reissue of:

[64] Patent No.: 5,113,833
Issued: May 19, 1992
Appl. No.: 538,412
Filed: Jun. 15, 1990

[30] Foreign Application Priority Data

Jun. 19, 1989 [JP] Japan ..... 1-154578

[51] Int. Cl.[6] ..... F02M 51/00; F02N 17/00

[52] U.S. Cl. ..... 123/478; 123/491

[58] Field of Search ..... 123/478, 480, 123/491, 179.17

[56] References Cited

U.S. PATENT DOCUMENTS

| | | | |
|---|---|---|---|
| 3,664,311 | 5/1972 | Endo | 123/491 |
| 3,812,830 | 5/1974 | Traisnel | 123/179.17 |
| 4,239,022 | 12/1980 | Drews et al. | 123/491 |
| 4,389,995 | 6/1983 | Koide et al. | 123/491 |
| 4,478,190 | 10/1984 | Kawai | 123/478 |
| 4,528,960 | 7/1985 | Mizuno et al. | 123/478 |
| 4,541,390 | 9/1985 | Steinbrenner et al. | 123/478 |
| 4,562,817 | 1/1986 | Ito | 123/478 |
| 4,563,994 | 1/1986 | Ujihashi | 123/491 |
| 4,697,568 | 10/1987 | Yasuoka | 123/490 |
| 4,718,387 | 1/1988 | Shinchi et al. | 123/478 |
| 4,724,816 | 2/1988 | Kanno et al. | 123/491 |
| 4,811,231 | 3/1989 | Hataoka | 361/431.05 |
| 4,957,086 | 9/1990 | Sasaki et al. | 123/478 |

FOREIGN PATENT DOCUMENTS

| | | | |
|---|---|---|---|
| 2814693 | 10/1979 | Germany | 123/491 |
| 3333513A1 | 4/1985 | Germany . | |
| 3728118A1 | 3/1989 | Germany . | |
| 2170862 | 8/1986 | United Kingdom . | |

*Primary Examiner*—Thomas N. Moulis
*Attorney, Agent, or Firm*—Antonelli, Terry, Stout & Kraus

[57] ABSTRACT

A method and a controller for supplying a fuel to a plurality of cylinders of an internal combustion engine, in which engine operation conditions including the operating temperature of the engine are detected by various sensors attached to the engine and by using a microcomputer, and the fuel is successively supplied by being injected to the engine cylinders based on the detected engine operation conditions. The timing of fuel injection into each of the plurality of cylinders is [shifted from an exhaust stroke period to a suction stroke period according to the operating temperature of the engine among the detected engine operation conditions] *set in a suction stroke period at the time of the engine starting in a low temperature condition, and is shifted to an exhaust stroke period as the level of the engine temperature rises.*

12 Claims, 9 Drawing Sheets

FIG. 1A

Tw = -30°C

| | | | | |
|---|---|---|---|---|
| 1st CYLYNDER | SUCTION | COM-PRESSION | EXPLOSION | EXHAUSTION |
| 2nd CYLYNDER | EXHAUSTION | SUCTION | COM-PRESSION | EXPLOSION |
| 3rd CYLYNDER | EXPLOSION | EXHAUSTION | SUCTION | COM-PRESSION |
| 4th CYLYNDER | COM-PRESSION | EXPLOSION | EXHAUSTION | SUCTION |

FIG. 1B

Tw = 0°C

| | | | | |
|---|---|---|---|---|
| 1st CYLYNDER | SUCTION | COM-PRESSION | EXPLOSION | EXHAUSTION |
| 2nd CYLYNDER | EXHAUSTION | SUCTION | COM-PRESSION | EXPLOSION |
| 3rd CYLYNDER | EXPLOSION | EXHAUSTION | SUCTION | COM-PRESSION |
| 4th CYLYNDER | COM-PRESSION | EXPLOSION | EXHAUSTION | SUCTION |

FIG. 1C

Tw = 60°C

| | | | | |
|---|---|---|---|---|
| 1st CYLYNDER | SUCTION | COM-PRESSION | EXPLOSION | EX-HAUSTION |
| 2nd CYLYNDER | EX-HAUSTION | SUCTION | COM-PRESSION | EXPLOSION |
| 3rd CYLYNDER | EXPLOSION | EX-HAUSTION | SUCTION | COM-PRESSION |
| 4th CYLYNDER | COM-PRESSION | EXPLOSION | EX-HAUSTION | SUCTION |

FUEL INJECTION TIMING

IGNITION TIMING

METHOD AND CONTROLLER FOR SUPPLYING FUEL TO CYLINDERS OF MULTICYLINDER INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

This invention relates to a method of supplying fuel to a plurality of cylinders of an internal combustion engine and, more particularly, to a method and a controller for supplying fuel to cylinders of a multicylinder internal combustion engine while controlling fuel injection valves provided in association with the respective cylinders.

A sequential fuel injection control system in which fuel injection valves provided in association with cylinders are sequentially controlled in synchronism with the rotation of the engine to supply fuel is known as a conventional fuel supply system for multicylinder internal combustion engines. For this sequential fuel injection control, blowing start control, i.e., control of fuel injection starting and blowing termination, i.e., control of injection termination are effected, as described, for example, on page 1004 of Jidosha Gijutsu, VOL. 39, No. 9, 1985. In this control system, however, the fuel injection rate and the injection timing are determined by the engine load determined from the intake air flow rate and the engine revolutions and so on. Ordinarily, fuel injection is effected during the exhaust stroke at each cylinder except for a transition period when the load is abruptly changed.

That is, in this conventional system, fuel injection into each cylinder of the internal combustion engine is controlled in such a manner that the required fuel injection rate is first obtained based on Qa/N which is a quotient of the intake air flow rate Qa corresponding to the engine load and the engine revolutions N, corrected with various correction coefficients, and injection is effected during the exhaust stroke at each cylinder in consideration of the injection period determined according to the fuel injection rate.

This conventional system entails a problem of an increase in the amount of total exhaust carbon compound (THC) components of exhaust gas and, hence, problems of an increase in the fuel consumption and deterioration in the operating performance at the time of starting of the engine or, more particularly, during warm-up started from a low temperature condition.

SUMMARY OF THE INVENTION

It is therefore an object of the present invention to provide a method and a controller for supplying fuel to the cylinders of a multicylinder internal combustion engine which method and controller are capable of improving the exhaust gas composition, reducing the fuel consumption and improving the operating performance at the time of starting of the engine or, more particularly, during an operation of starting and warming up the engine in a low temperature condition.

To achieve this object, according to the present invention, there is provided a method of supplying fuel to the cylinders of a multicylinder internal combustion engine, in which engine operation conditions including the operating temperature of the engine are detected and the fuel is successively supplied by being injected to each of the engine cylinders based on the detected engine operation conditions, the method comprising [shifting] *setting* the timing of fuel injection into each of the plurality of cylinders [from an exhaust stroke period to a suction stroke period according to the operating temperature of the engine among the detected engine operation conditions. *in a suction stroke period at the time of engine starting in a low temperature condition, and is shifted to an exhaust stroke period at the level of the engine temperature rises.*

To achieve the above object, there is also provided a method of supplying a fuel to cylinders of a multicylinder internal combustion engine, in which engine operation conditions are detected and the fuel is successively supplied by being injected to each of the engine cylinders based on the detected engine operation conditions, the method comprising injecting the fuel into intake air flowing into each cylinder of the engine at least under a predetermined engine operation condition.

To achieve the above object, there is also provided a fuel supply controller for a multicylinder internal combustion engine, including: a detection means for detecting engine operation conditions including the operating temperature of the engine; a control means for determining the rate at which the fuel is supplied to each of the plurality of engine cylinders and the fuel injection timing by being supplied with a signal from the detection means; and a fuel injection means for successively injecting the fuel to each of the engine cylinders by controlling valve opening based on a fuel injection control signal supplied from the control means: wherein the control means is supplied with an engine temperature output signal from the engine condition detection means and [shifts] *sets* the fuel injection timing, based on the fuel injection control signal [from an exhaust stroke period to a suction stroke period], *in a suction stroke period at the time of engine starting in a low temperature condition, and is shifted to an exhaust stroke period as the level of the engine temperature rises,* according to the level of the engine temperature output signal.

The present invention is based on the results of various experiments which indicate that a fuel injected during an exhaust stroke when the engine is in a low temperature condition is not evaporated but becomes attached to inner surfaces of intake pipes to be supplied in a liquid state to the interior of the cylinder.

The means for achieving the object of the present invention [shifts] *sets* the fuel injection timing [toward] *in* the suction stroke period at the time of engine starting in a low temperature condition to prevent injected fuel from attaching to intake pipe walls, thereby directly supplying atomized fuel to flows of intake air. The fuel supply performance at the time of low temperature engine starting is thereby improved as well as fuel consumption and operating performance.

BRIEF DESCRIPTION OF THE DRAWINGS

FIGS. 1A, 1B, and 1C are timing charts showing the timing of injecting fuel to each of cylinders of a multicylinder internal combustion engine based on a fuel supply method in accordance with an embodiment of the present invention with respect to cases where the temperature of cooling water is −30° C., 0° C., and 60° C., respectively;

FIG. 9 shows the conventional method in which fuel is injected during an exhaust stroke;

FIG. 10 shows a state of the engine shown in FIG. 9 during a suction stroke;

FIG. 11 shows a state of fuel injection in an engine in accordance with the present invention;

DESCRIPTION OF THE PREFERRED EMBODIMENT

A preferred embodiment of the present invention will be described below along with the prior art with reference to the accompanying drawings.

Figure 12:
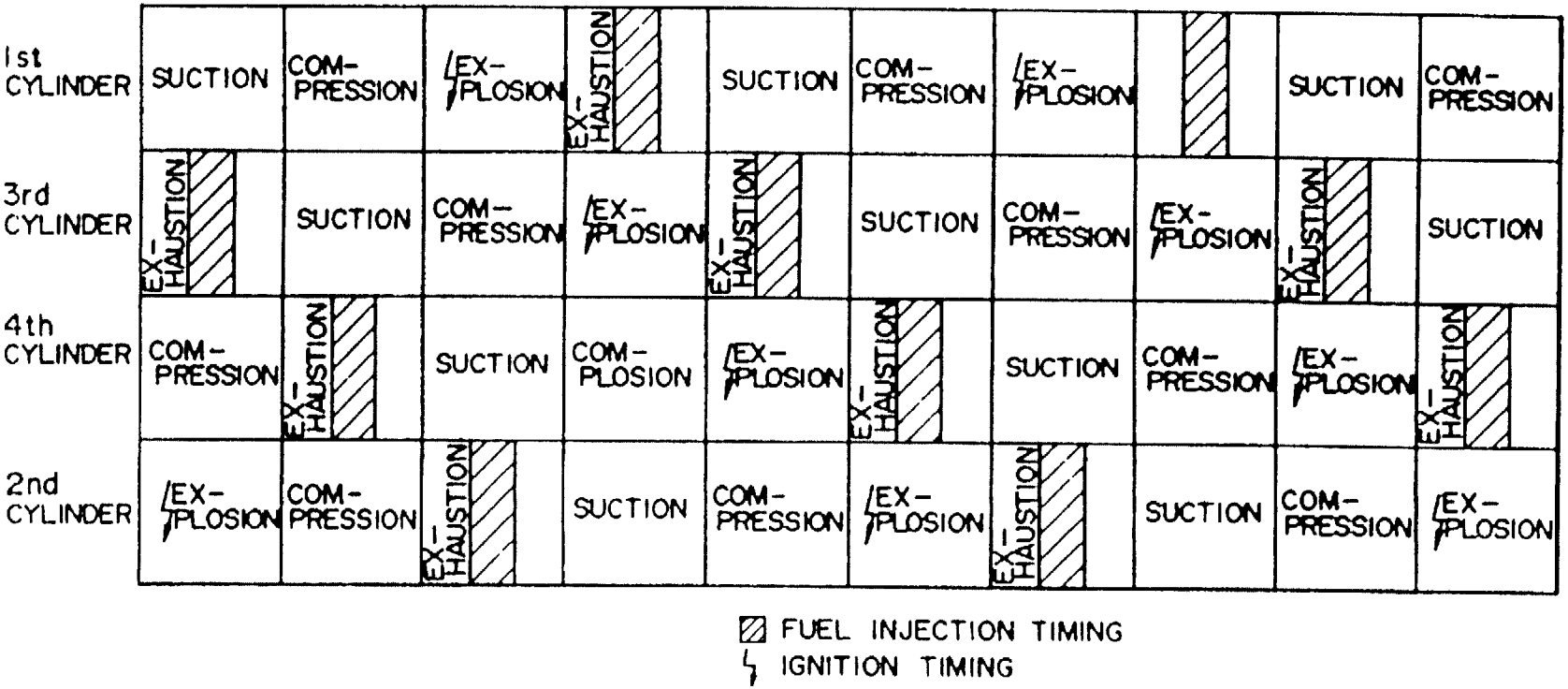
FIG. 12 PRIOR ART
FIG. 12 is a timing chart showing a conventional fuel supply method.

In the above-described conventional system described on page 1004 of Jidosha Gijutsu, VOL. 39, No. 9, 1985, fuel injection into each cylinder of the internal combustion engine is controlled in such a manner that, as shown in the timing chart of FIG. 12, the required fuel injection rate is first calculated based on Qa/N which is a quotient of the intake air flow rate Qa corresponding to the engine load and the engine revolutions N, corrected with various correction coefficients, and the injection is effected during the exhaust stroke at each cylinder, as indicated by hatching in the timing chart, in consideration of the injection period determined according to the fuel injection rate.

Figures 13A, 13B:
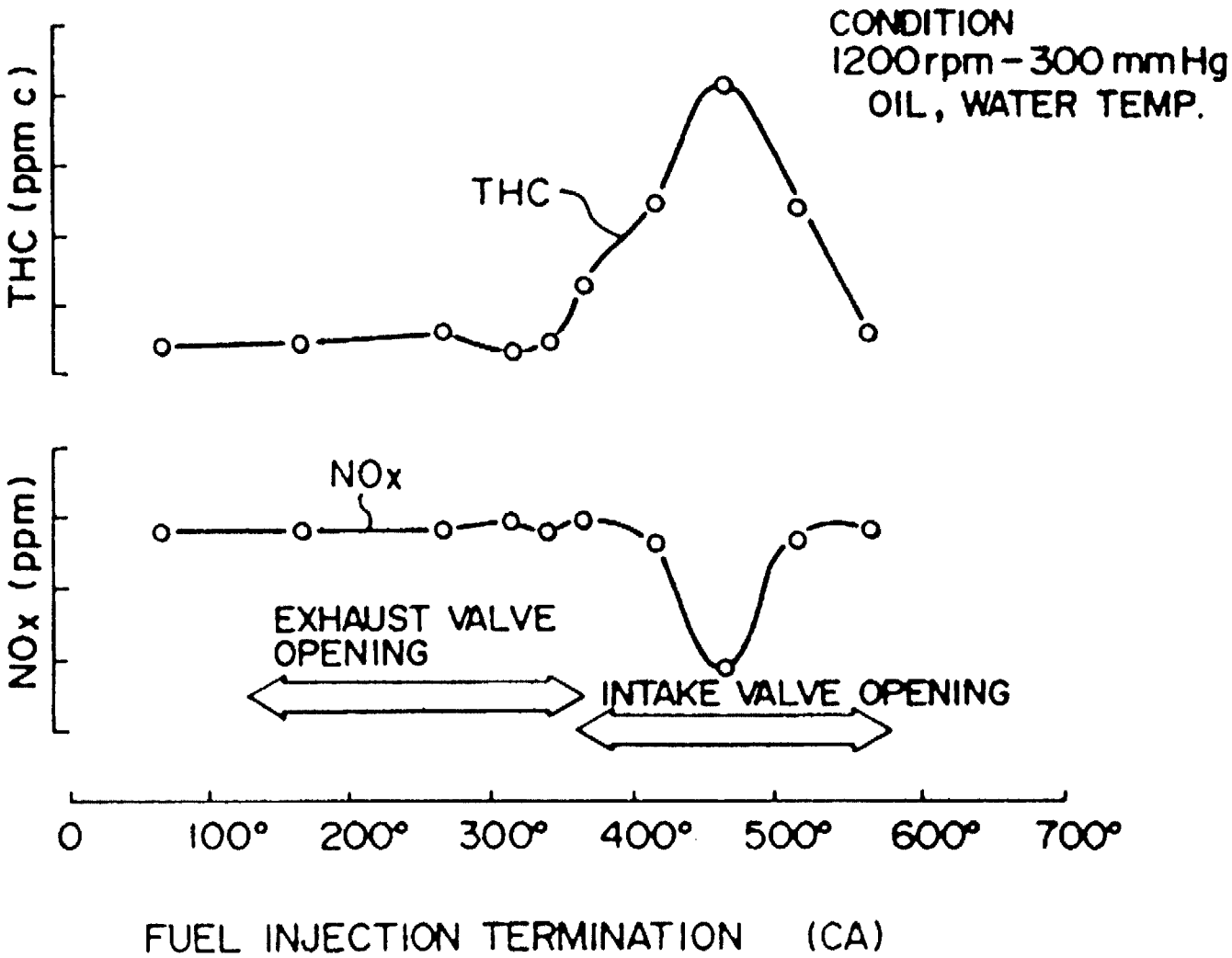
FIG. 13A PRIOR ART
FIG. 13B PRIOR ART
FIG. 13A is a graph of characteristics of the change in the amount of total exhaust carbon compound (THC) components according to the conventional method.
FIG. 13B is a graph corresponding to FIG. 13A, showing the change in the amount of exhaust nitrogen oxide components.

This is because, as represented by exhaust gas characteristics shown in FIGS. 13A and 13B, the amounts of exhaust gas components (on the ordinate of the graphs of FIGS. 13A and 13B), i.e., nitrogen oxides (NOx) and total carbon compounds (THC) including carbon monoxide and hydrocarbons (HC) are greatly influenced by the fuel injection timing. For example, if the time at which fuel injection is terminated is set in the suction period while the engine is operating in an ordinary operating range, NOx components in the exhaust gas are reduced as shown in FIG. 13B, but the THC components are increased as shown n FIG. 13A and the engine output is reduced simultaneously. The reason for this effect may be that, if the fuel is injected during the suction stroke of the engine, it is ignited before it is sufficiently evaporated and mixed with air in the cylinder. The abscisas of the graphs shown in FIGS. 13A and 13B represent the crank angle (CA), i.e., the angle of the crankshaft to indicate the fuel injection timing.

The above-described conventional system entails a problem of an increase in the amount of THC components in exhaust gas and, hence, problems of an increase in the fuel consumption and deterioration in the operating performance at the time of starting of the engine or, more particularly, during half warm-up started from a low temperature condition.

The results of experiments conducted as a basis for the present invention will be described before the description of an embodiment of the present invention.

Figure 9:
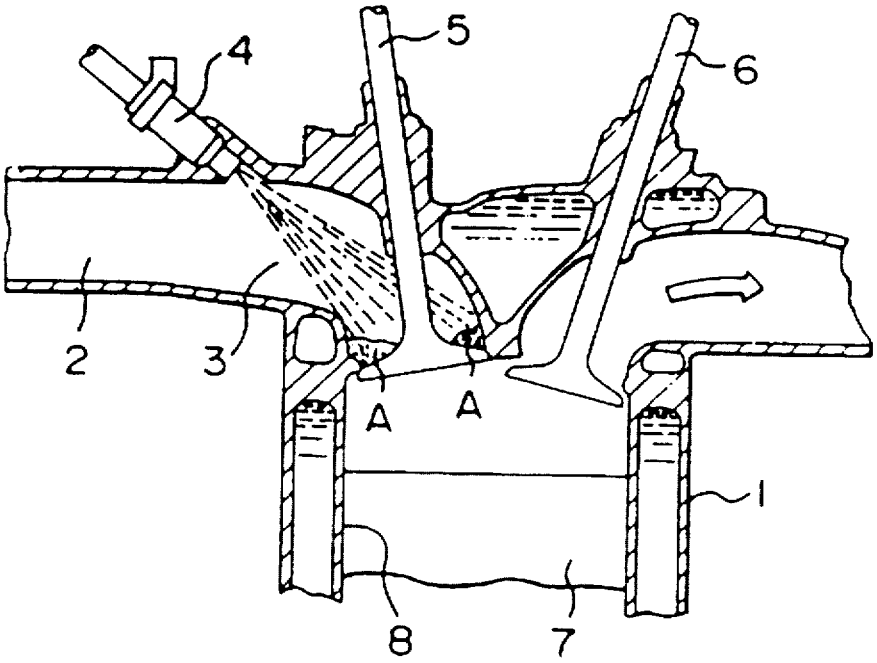
FIG. 9 PRIOR ART
FIGS. 9 to 11 are cross-sectionals views of engines, showing the results of experiments on which the present invention is based.

Ordinarily, the supply of fuel to cylinders of a multicylinder internal combustion engine is effected as described below. As shown in FIG. 9, fuel is jetted from a fuel injection valve 4 attached to each of intake pipes 2 of an engine 1 in the vicinity of a cylinder intake opening 3 toward an umbrella-like portion of an intake valve 5 which is attached to a cylinder head portion so as to be movable generally along the axial direction of a cylinder 8. At this time, the operation cycle of the engine 1 is at an exhaust stroke with respect to that cylinder; the exhaust valve 6 is open and the piston 7 is in an up stroke.

During the exhaust stroke, if the engine 1 is cool because, for example, it has been just started, most of the fuel jetted from the fuel injection valve 4 is not evaporated but, in a liquid state, attached to and accumulated on inner wall portions of the intake pipe 2 and peripheral portions of the intake valve 5, as indicated by hatching in FIG. 9.

Figure 10:
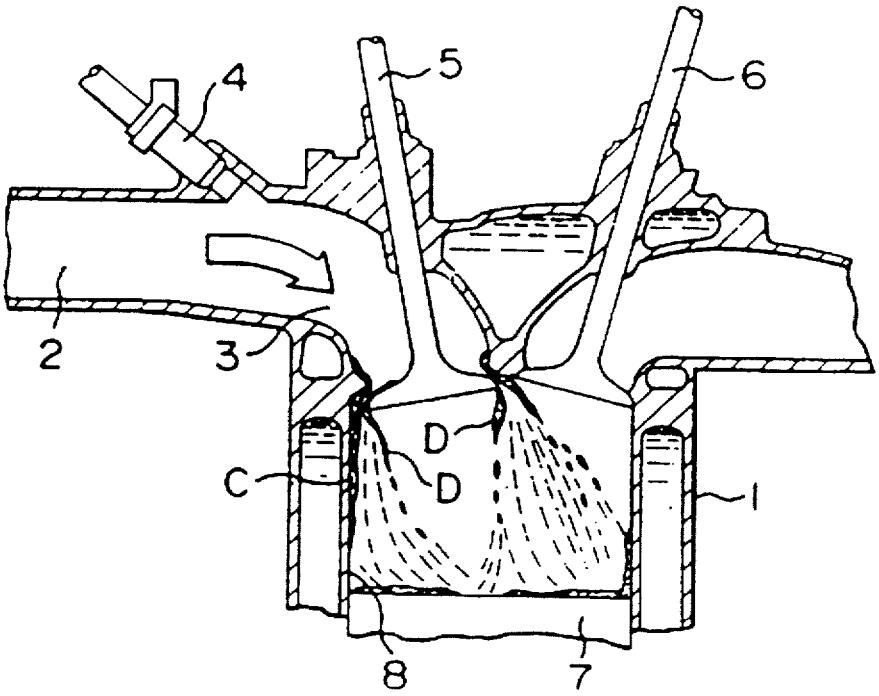
FIG. 10 PRIOR ART

When the operation of the engine 1 proceeds into a suction stroke, the exhaust valve 6 is closed while the intake valve 5, which has been closed, is opened, as shown in FIG. 10. A certain amount of air according to the throttle opening is thereby introduced into the cylinder 8 via an air cleaner (not shown). At this time, part of the fuel attached and accumulated in a liquid state as described above flows along an inner wall surface of the cylinder 8 (as indicated by a reference symbol C in FIG. 10), while the rest of fuel is mixed in flows of air drawn into the cylinder 8 as droplets having comparatively large sizes (as indicated by a reference symbol D) to be introduced into the cylinder 8. In this case, a great part of the fuel supplied to the interior of the cylinder 8 remains in a liquid state without being evaporated, and it is therefore impossible to completely burn the fuel even by high-energy ignition, resulting in deterioration of the exhaust gas composition (more specifically, an increase in the THC content of the exhaust gas) as well as a reduction in the engine power output. Under such a condition, in the conventional system, the rate at which the injected fuel is evaporated is low and the mixture of the air and the fuel in the cylinder 8 is in a lean gas state. As a result, the combustion is weak, the contents of carbon monoxide and hydrocarbons are increased, and the fuel consumption is increased.

Conventionally, to cope with this problem, the fuel supply system is improved in various ways based on, for example, increasing the fuel injection rate. Under the existing circumstances, however, it is not possible to avoid deterioration of the exhaust gas composition and an increase in the fuel consumption.

Figure 11:
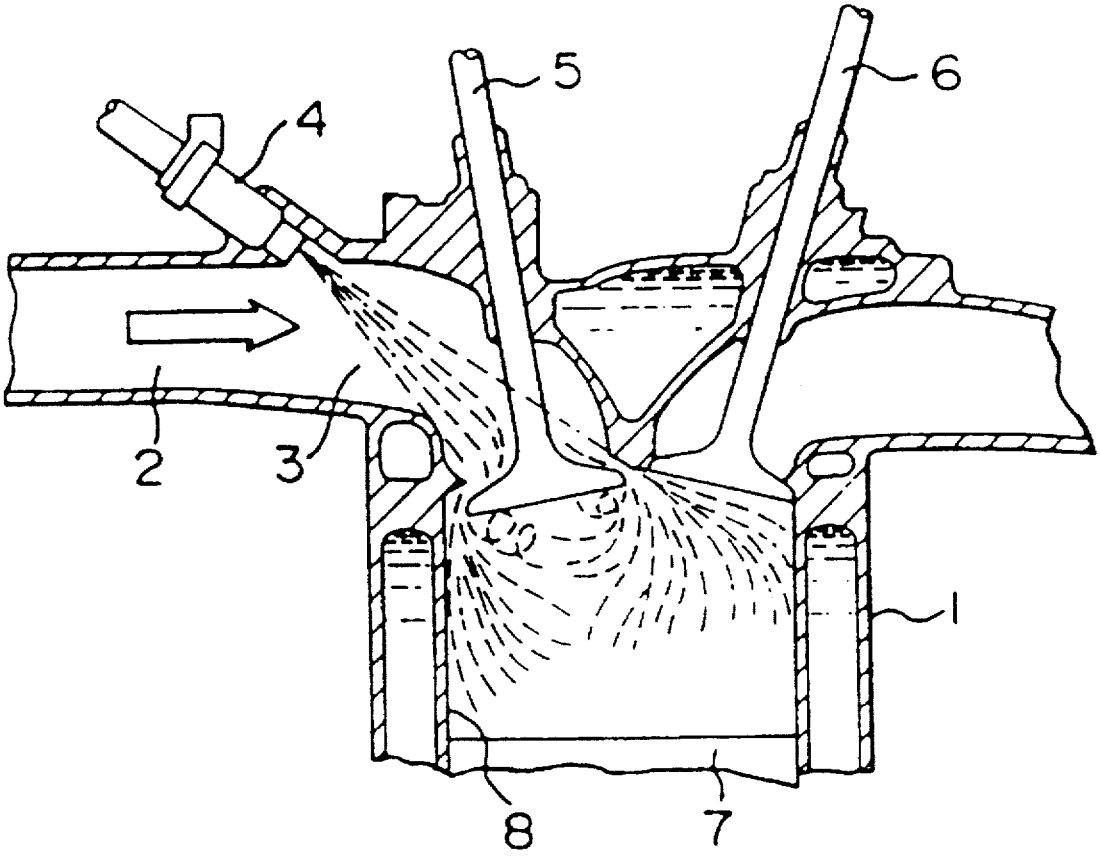

FIG. 11 shows a state in which fuel is injected when the cycle of the engine 1 is at a suction stroke. In this case, as is apparent from FIG. 11, the fuel injected through the fuel injection valve 4 is mixed in an atomized state with intake air and is drawn into the cylinder 8 of the engine. Accordingly, in comparison with injection during the exhaust stroke shown in FIGS. 9 and 10, the evaporation of fuel can be promoted. At the same time, the non-uniformity of distribution of the fuel in the cylinder 8 owing to the attachment or the like can be reduced and the formation of air/fuel mixture gas can be remarkably improved.

A fuel supply controller for a multicylinder internal combustion engine in accordance with the present invention will be described below with reference to the drawings.

First, the overall system of the controller will be described with reference to FIG. 2. Air introduced through an inlet 2 of an air cleaner 11 passes through a filter 11, passes through a hot wire air flow meter 13, and flows through a duct 14 disposed downstream thereof, a throttle body 15 including a throttle valve 15A for controlling the intake air flow rate to enter a collector 16. The air absorbed in the collector 16 is distributed to intake pipes 18 connected to respective cylinders of a multicylinder internal combustion engine 1 and is drawn into each cylinder of the engine 1.

On the other hand, a fuel is drawn from a fuel tank 19 and pressurized by a fuel pump 20 and is introduced to fuel inlets of fuel injection valves 23 through a fuel damper 21 and a fuel filter 22. Part of the fuel introduced to the fuel injection valves 23 via the fuel filter 22 is led to a fuel pressure regulator 24 and is returned to the fuel tank 19. By the operation of this fuel pressure regulator, the pressure of the pressurized fuel supplied to the fuel injection valves 23 is controlled so as to be constant. The fuel is injected into the intake pipes from the injection valves 23. In accordance with the present invention, as is apparent from FIG. 2, the fuel injection valves 23 are attached to wall portions of the intake pipes 18 in the vicinity of intake ports of the cylinders. The fuel injection valves are provided for the respective cylinders of the multicylinder engine to control the fuel supply rate for each cylinder. Thus, a multi-point injection (MPI) system is constructed.

Figure 2:
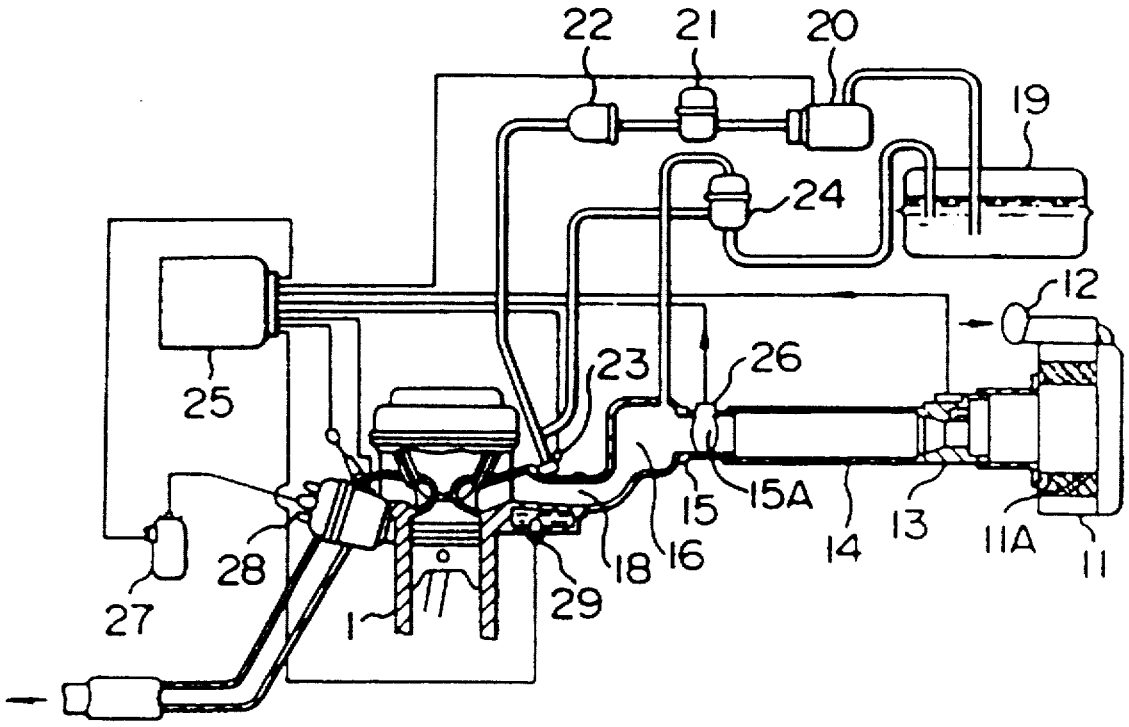
FIG. 2 is a block diagram of the system of a fuel supply controller for supplying a fuel based on the fuel supply method of the present invention.

The reference symbol 29 in FIG. 2 designates a water temperature sensor for detecting the temperature of water for cooling the engine 1.

This embodiment will be described below in detail. An electrical signal output from the air flow meter 13 and representing the intake air flow rate is supplied to a control unit 25 described later in detail. A throttle sensor 26 for detecting the opening of the throttle valve 15A of the throttle body 15 is attached to the throttle body 15. A signal output from the throttle sensor 26 is also supplied to the control unit 25.

Figure 3:
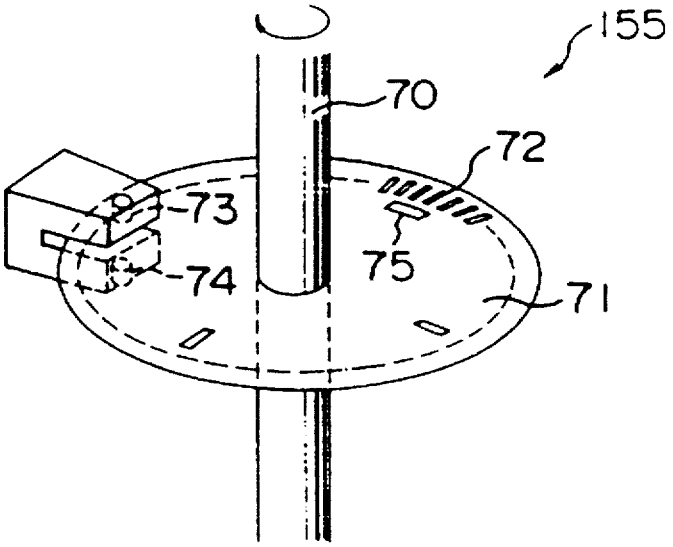
FIG. 3 is a perspective view of a crank angle sensor of the fuel supply controller shown in FIG. 2.

A distributor 28 is disposed in the vicinity of the engine (on the left hand side of the engine 1). The distributor 28 incorporates a crank angle sensor for detecting the crank angle speed of the engine. For example, this crank angle sensor has a construction such as that designated by a reference symbol 155 in FIG. 3. That is, small apertures 72 are formed at predetermined angular intervals in a metallic disk 71 attached to a crankshaft 70 of the engine 1, and a light emitting element 73 and a light receiving element 72 are disposed on the opposite sides of the disk to output a signal proportional to the angle of rotation of the crankshaft 70. In addition to the small apertures 72 formed at the predetermined angular intervals, an aperture 75 larger than the small aperture 72 is formed in the metallic disk 71 of the crank angle sensor 155 in a position corresponding to a predetermined angle of the crankshaft to produce a reference position signal for indicating the reference position in association with the signal representing the angle of rotation.

These output signals are also supplied to the control unit 25. Other sensors, e.g., a water temperature sensor for detecting the temperature of engine cooling water and an $O_2$ sensor for detecting the oxygen concentration in exhaust gas are provided, although they are not shown in FIG. 2. The control unit 25 is supplied with signals representing engine operation conditions from the above-described various sensors, effects predetermined arithmetic processing and drives various actuators for optimum control according to the engine operation conditions. For example, as also shown in FIG. 2, the control unit 25 controls a power transistor attached to a side portion of an ignition coil 27 and serving to control the supply of high-tension ignition voltage to each cylinder by switching on/off, the fuel injection values 23 for injecting and supplying the fuel into the cylinders of the engine 1, and the operation of the fuel pump 20.

Figure 4:
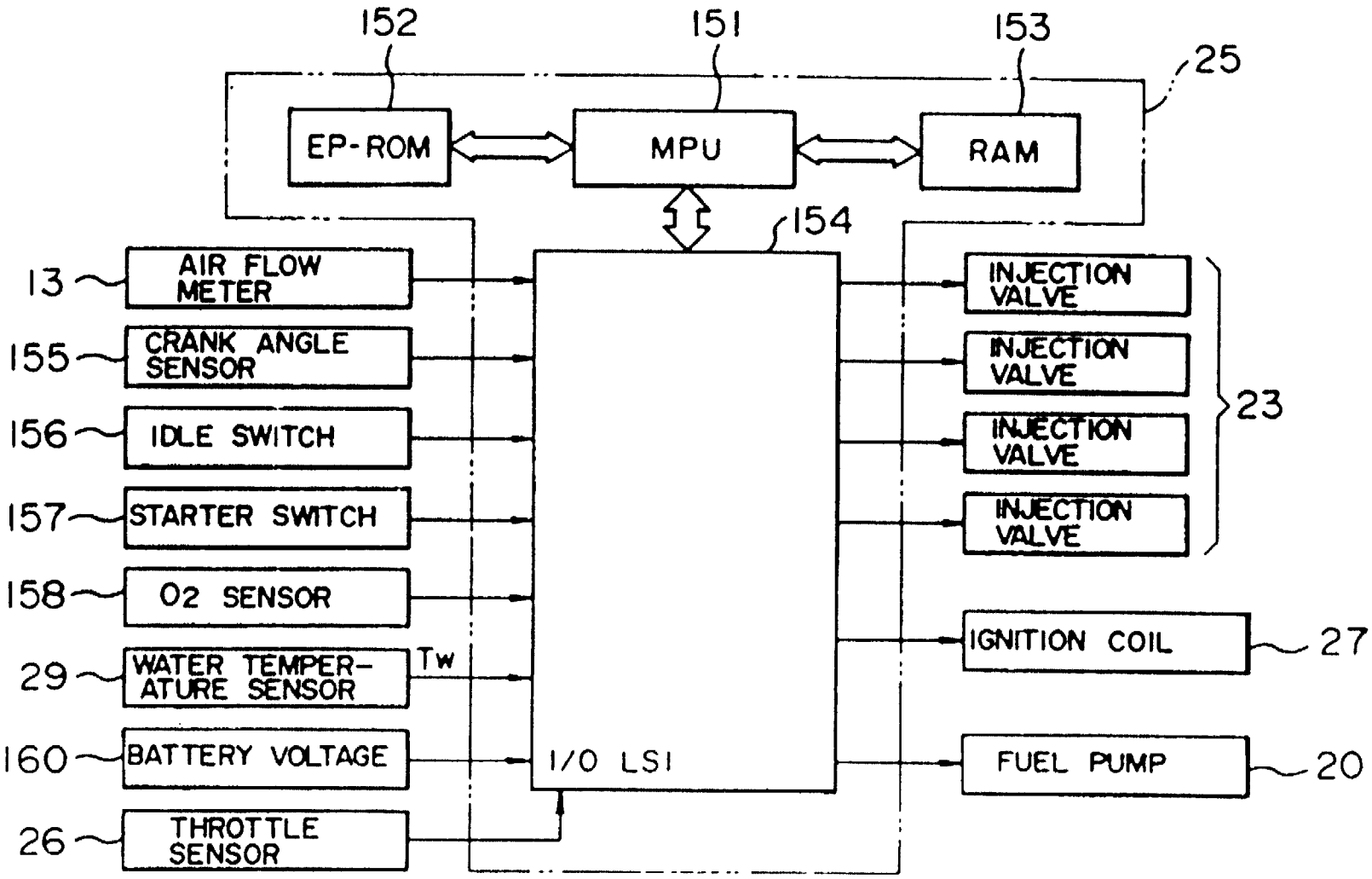
FIG. 4 is a block diagram showing the internal construction of a control unit of the fuel supply controller shown in FIG. 2 as well as electrical connections between input/output components.

As shown in FIG. 4, the control unit 25 is constituted by a multi-processor unit (MPU) 151, a rewritable nonvolatile memory (EP-ROM) 152, a random access memory (RAM) 153, and an LSI circuit component supplied with the signals representing the engine operation conditions detected by the various sensors and outputting control signals for driving various actuators, i.e., an I/O LSI 154. More specifically, the I/O LSI 154 is supplied with signals output from the air flow meter 13, the crank angle sensor 155, an idle switch 156, a starter switch 157, an $O_2$ sensor 158, the water temperature sensor 29, a battery voltage sensor 160 and the throttle sensor 26. These signals may be supplied through an analog-digital (AD) converter incorporated in the I/O LSI or through an external AD converter. The control units 25 then effects predetermined calculations with the MPU 151, the EP-ROM 152, and the RAM 153 and controls the operations of the fuel injection valve 23 which are engine control actuators, the power transistor attached to the ignition coil 27 and the fuel pump 20.

The operation of the control unit described above will be described below in detail. Referring to the flow chart of FIG. 5, the temperature Tw of engine cooling water is read in step 100, and, in step 101 a table previously stored is searched for a pulse width remaining rate Kr for determining the percent of a part of a fuel injection pulse width Ti set the period of a suction stroke on the basis of the engine cooling water temperature Tw. FIG. 6 shows an example of data stored in this table. That is, when the engine cooling water temperature Tw is low, the pulse width remaining rate Kr is large (e.g., 100% at about −30° C.). As the engine cooling water temperature Tw rises, the pulse width remaining rate Kr becomes reduced. For example, it is set to 50% at about 10° C. and is set to 0% at about 60° C.

Figure 7:
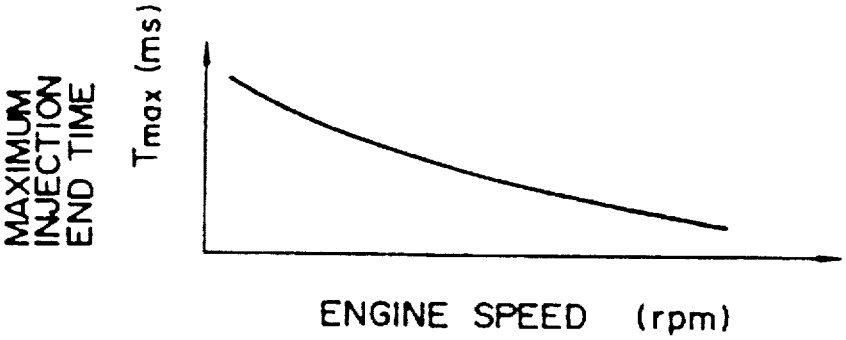

Next, in step 102, an intake air flow rate Qa is fetched from the signal output from the hot wire air flow meter 13. In step 103, the number of engine revolutions N is obtained from the signal output from the crank angle sensor. Thereafter, in step 104, a time $T_f$ for four engine strokes (suction, compression, explosion, and exhaustion strokes) is obtained by using N obtained in the preceding step. In step 105, a maximum injection end time Tmax is obtained by using N. The maximum injection end time Tmax designates the limit of the fuel injection end point, and the object of determining this limit is to prevent occurrence of intake fuel residue owing to a response delay. For example, the maximum injection end time Tmax is determined with respect to the number of engine revolutions N, as shown in FIG. 7. When N is small (when the engine rotates at a low speed), Tmax is large; when N is large (when the engine rotates at a high speed), Tmax is small. Numerical data on this relationship is previously stored in the memory, and Tmax is searched for by using N as a parameter.

In step 106, a mixture ratio correction coefficient COEF is calculated from various parameters representing the engine operation conditions (e.g., the engine cooling water temperature and the output from the $O_2$ sensor). In step 107, a final injection pulse width Ti is obtained by the following equation:

$$Ti = K \times \frac{Qa}{N} \times COEF + TS \quad (1)$$

where Ti represents the fuel injection pulse width, K represents a modification coefficient, Qa represents the intake air flow rate, COEF represents the mixture ratio correction coefficient, and TS represents an ineffective pulse width.

Then, in step 108, fuel injection start timing Tinjst is calculated by the following equation based on Ti obtained above:

$$Tinjst = \tfrac{3}{4}T_I - (1 - Kr)Ti \quad (2)$$

In step 109, the fuel injection end point is limited. That is, if Tmax≧Tinjst+Ti, the process directly proceeds to step 111, or, if Tmax<Tinjst+Ti, Tinjst is corrected based on the following equation:

$$Tinjst = Tmax - Ti \quad (3)$$

In step 111, the fuel injection start timing Tinjst after limiting the fuel injection end point is set in a register. This register starts incrementing from zero (0) when supplied with a signal representing a reference point (e.g., a bottom dead center (BDC) 110° behind a reference signal for each cylinder) used as a basis for the fuel injection control for each cylinder. The register produces an output signal when the increment value coincides with the above-mentioned set data. This output signal is supplied as an injection signal to the corresponding fuel injection valve 23. In step 112, Ti obtained in step 107 is set in an injection termination register. This injection termination register is connected to the above injection start register. When the injection start register outputs an injection signal, the injection termination register starts incrementing the count value from zero (0). When this incremented value (data) and the value (data) set in the injection termination register become equal to each other, the injection termination register stops the injection signal output to the fuel injection valve.

Figure 8:
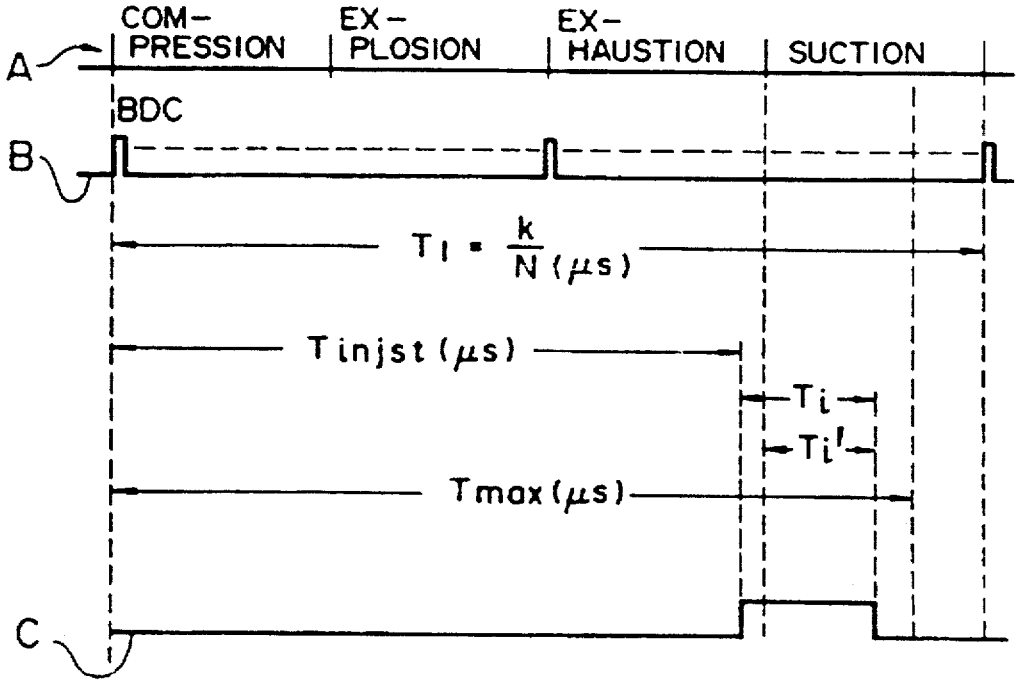
FIG. 8 is a time chart of the content of the control flow shown in FIG. 5.

Next, the content of the control process in accordance with the above-described flow, i.e., formation of the injection signal for controlling opening/closing of each fuel injection valve will be described below with reference to FIG. 8. In a section A of FIG. 8, the stroke status of the engine, i.e., a sequence of four strokes, compression, explosion, exhaustion, and suction strokes, is shown. The line B shown in FIG. 8 represents the angle signal supplied from the crank angle sensor (to indicate, for example, angles stepped by 1°). The following control is conducted on the basis of the bottom dead center (BDC) (not shown) lagging behind the reference signal for each cylinder by 110°.

Figure 5:
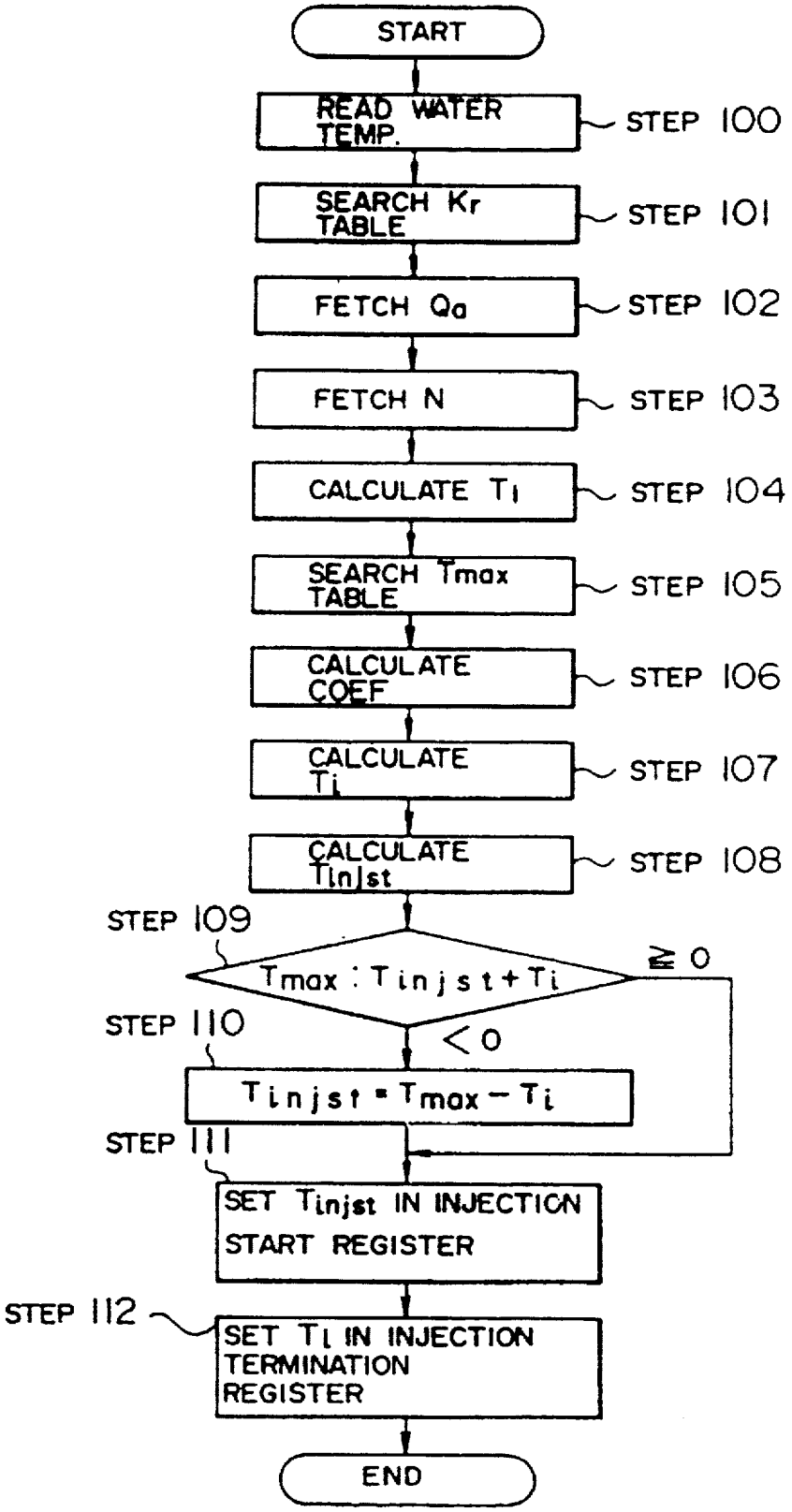
FIG. 5 is a flow chart of a control program of the operation of the control unit for in accordance with the fuel supply method of the present invention.
Figure 6:
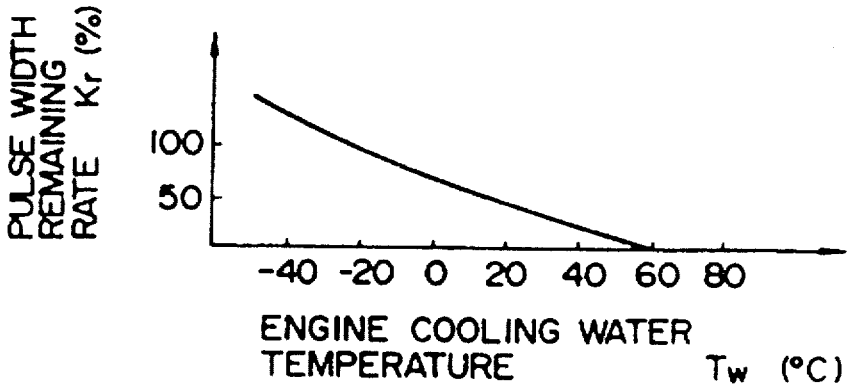
FIGS. 6 and 7 are graphs showing the contents of data stored in a storage table used in the control flow shown in FIG. 5.

$T_I$ calculated in step 104 of FIG. 5 represents the period of time for the above four strokes and can be obtained by using the following equation:

$$T_I = K/N \quad (4)$$

where k is a constant.

The fuel injection pulse width Ti calculated in step 107 represents the pulse width of the injection signal indicated by the line C in FIG. 8. Ti' represents a part of the fuel injection pulse width Ti overlapping the time region corresponding to the suction stroke. The relationship between the pulse remaining rate Kr and Ti and Ti' is expressed as $$Kr = \frac{Ti}{T_1} \quad (5)$$

A value of 100% of Kr in accordance with this equation means that no part of the pulse signal appears during the exhaust stroke and that the whole of this signal appears after the suction stroke has been started.

The fuel injection start timing Tinjst in the above equations represents the passage of time from the reference point (BDC), and the time before the start of the suction stroke is expressed as $\tfrac{3}{4}T_I$. The following equation is therefore established:

$$\tfrac{3}{4}T_I + Ti' = Tinjst + T_I = \quad (6)$$

$Kr - Ti$ from equation (5) is substitued in equation (6), thereby expressing *Tinjst* as follows $$Tinjst = \tfrac{3}{4}T_I - )t - Kr)Ti \quad (7)$$

As is apparent from this equation, the fuel injection start timing Tinjst can be easily obtained from the fuel injection pulse width Ti and the pulse width remaining rate Kr.

As shown in FIG. 8, Tmax which is the limit of the fuel injection end point limits the trailing end of the fuel injection pulse width Ti indicated by the line C (i.e., Tinjst+Ti), and there is no possibility of on state after Tmax.

The fuel supply based on this control is as shown in FIGS. 1A, 1B, and 1C. That is, in case where the engine is started in a low temperature condition (for example, engine cooling water temperature Tw=−30° C.), the fuel injection valve for supplying the fuel to each cylinder injects the fuel during the suction stroke at each cylinder. As the engine is thereafter heated up during operation, the fuel injection timing of the fuel injection valve is shifted from the suction stroke period to the exhaust stroke period, as shown in FIG. 1B. That is when the engine cooling water temperature Tw is 0° C., the pulse remaining rate Kr is about 70%.

After the engine cooling water temperature Tw has been further increased, and when it becomes, for example, 60° C., the fuel injection timing of the fuel injection valve is completely shifted to the exhaust stroke period, as shown in FIG. 1C. After the engine cooling water temperature Tw has been further increased and when it becomes, for example, 80° C., the fuel injection timing of the fuel injection valve is returned to the injection timing for ordinary operation.

In the above-described embodiment, the fuel injection timing of each fuel injection valve is continuously changed according to the change in the engine cooling water temperature Tw. However, the manner of changing the injection timing in accordance with the present invention is not limited to this. For example, the injection timing may be changed in a stepping manner with respect to a plurality of ranges of engine cooling water temperatures set as desired.

In the above-described embodiment, since the function of the fuel injection valve for injecting and supplying the fuel to each engine cylinder resides in forming air/fuel mixture gas by directly mixing atomized fuel in the air drawn into each cylinder, the fuel and the air cannot be suitably mixed and the desired effects cannot be obtained, if the particle size of the injected fuel is excessively large. It has been confirmed by various experiments that good effects can be obtained if the atomized particle size is 100 μm or less. In accordance with the above-described embodiment, therefore, fuel injection valves capable of forming injected fuel particles having a size smaller than 100 μm, e.g., 80 to 90 μm are used. However, fuel injection valves capable of injecting fuel with a 120 to 130 μm fuel particle size may actually be selected from fuel injection valves presently available to achieve similar effects.

As shown in FIG. 11, each injection valve may be mounted so as to face the intake valve mounted at the upper end of the cylinder, thereby making it possible to form a suitable air/fuel mixture gas by mixing injected fuel in an atomized state with intake air.

As can be clearly understood from the above description, the method and the controller for supplying fuel to cylinders of a multicylinder internal combustion engine make it possible to prevent deterioration of the exhaust gas composition, increase in the fuel consumption and deterioration of the operating performance. According to the present invention, it is also possible to delay the timing of calculation of the fuel supply rate by [shifting] *setting* the fuel injection timing [from the exhaust stroke period to] *in* the suction stroke period at the time of starting of the engine when the change in the engine speed is particularly large, thereby enabling the fuel to be supplied more precisely.

What is claimed is:

1. A method of supplying fuel to a plurality of cylinders of an [intrnal] *internal* combustion engine, in which engine operation conditions including the operating temperature of the engine are detected and the fuel is successively supplied by being injected to each of the engine cylinders based on detected engine operation conditions, said method comprising the steps of:

[shifting] *setting* the timing of fuel injection into each of the plurality of cylinders [from an exhaust stroke period to a section stroke period according to the operating temperature of the engine among the detected engine operation conditions] *in a suction stroke period at the time of engine starting in a low temperature condition, and shifting the timing of fuel injection to an exhaust stroke period progressively as the level of the engine temperature rises*;

when the rate of the fuel supply to each cylinder is determined based on the detected engine operation conditions, determining a limit of fuel injection end [portion] *point*; and controlling the fuel supply so that the termination point of the fuel injection timing does not exceed the fuel injection end point limit.

2. A method of supplying a fuel to a plurality of cylinders of an internal combustion engine, according to claim 1, wherein the shifting of the fuel injection timing includes shifting the fuel injection start timing.

3. A method of supplying a fuel to a plurality of cylinders of an internal combustion engine, according to claim 1, wherein the fuel is injected so that the particle size of atomized fuel is not larger than 120 μm.

4. A controller for controlling the supply of a fuel to a plurality of cylinders of an internal combustion engine, comprising:

detection means for detecting engine operation conditions including the operating temperature of the engine;

control means for determining the rate at which the fuel is supplied to each of the plurality of engine cylinders and the fuel injection timing [be] *by* being supplied with a signal from said detection means; and fuel injection means for successively injecting the fuel to each of the plurality of engine cylinders by controlling valve opening based on a fuel injection control signal supplied from said control means:

wherein said control means is supplied with an engine temperature output signal from said engine condition detection means and [shifts] *sets* the fuel injection timing [based on] *in a suction stroke period when* the fuel injection control signal [from an exhaust stroke period to a suction period according to] *indicates that the engine is to be started in a low temperature condition, and shifts the fuel injection timing progressively to an exhaust stroke period as* the level of the engine temperature output signal *rises*, and wherein said controller outputs the fuel injection control signal and a signal for determining a limit of the fuel injection end point, and controls valve opening of said fuel injection means so that the limit of the fuel injection end point is not exceeded.

5. An apparatus for supplying a fuel to a plurality of cylinders of an internal combustion engine according to claim 4, wherein the shifting of the fuel injection timing effected by said controller includes shifting the fuel injection start timing based on the fuel injection control signal.

6. An apparatus for supplying a fuel to a plurality of cylinders of an internal combustion engine according to claim 4, wherein said fuel injection means includes a fuel injector capable of injecting the fuel so that the particle size of atomized fuel is not larger than 120 μm.

7. A method of supplying fuel to a plurality of cylinders of an internal combustion engine, comprising the steps of:

detecting engine operating conditions including the operating temperature of the engine, intake air amount and engine rotation speed;

determining a fuel injection period during which fuel is to be injected to each of the cylinders based on said detected engine operating conditions;

determining a fuel injection start time relative to a reference angle of the engine crankshaft for each cylinder and based on a coefficient related to the operating temperature of the engine so that said fuel injection start time is shifted *progressively* from [an exhaust] *a suction* stroke period toward [a suction] *an exhaust* stroke period for a cylinder as the operating temperature of the engine increases;

determining a maximum limit for the end point of said fuel injection period; and when the end point of said fuel injection period exceeds said maximum limit for a determined fuel injection period and a determined fuel injection start time for a given cylinder, shifting the fuel injection start time toward said exhaust stroke period to prevent said end point from exceeding said maximum limit.

8. A method according to claim 7, wherein, when the end point of said fuel injection period exceeds said maximum limit, shifting the fuel injection start time only to the extent that said end point exceeds said maximum limit.

9. A method according to claim 7, wherein said fuel injection start time Tinjst is determined from the following relationship:

$$Tinjst = \tfrac{3}{4}T_f - (1-Kr)Ti$$

where $T_f$ represents the period of time for four strokes of the internal combustion engine, Ti is the fuel injection period and Kr is a coefficient which is obtained from a table on the basis of the detected operating temperature of the engine.

10. An apparatus for supplying fuel to a plurality of cylinders of an internal combustion engine, comprising:

means for detecting engine operating conditions including the operation temperature of the engine, intake air amount and engine rotation speed;

means for determining a fuel injection period during which fuel is to be injected to each of the cylinders based on said detected engine operating conditions;

means for determining a fuel injection start time relative to a reference angle of the engine crankshaft for each cylinder and based on a coefficient related to the operating temperature of the engine so that said fuel injection start time is [shifted from an exhaust stroke period toward a suction stroke period for a cylinder as the operating temperature of the engine increases] *set in a suction stroke period at the time of engine starting in a low temperature condition*;

means for determining a maximum limit for the end point of said fuel injection period; and means for shifting the fuel injection start time toward said exhaust stroke period to prevent said end point from exceeding said maximum limit, when the end point of said fuel injection period exceeds raid maximum limit for a determined fuel injection period and a determined fuel injection start time for a given cylinder.

11. An apparatus according to claim 10, wherein, when the end point of said fuel injection period exceeds said maximum limit, the fuel injection start time is shifted only to the extent that said end point exceeds said maximum limit.

12. An apparatus according to claim 10, wherein said fuel injection start time Tinjst is determined from the following relationship:

$$Tinjst=\tfrac{3}{4}T_f-(1-Kr)\ Ti$$

where $T_f$ represents the period of time for four strokes of the internal combustion engine, Ti is the fuel injection period and Kr is a coefficient which is obtained from a table on the basis of the detected operating temperature of the engine.

* * * * *